United States Patent [19]

Björkman et al.

[11] Patent Number: 5,199,247
[45] Date of Patent: Apr. 6, 1993

[54] ARRANGEMENT FOR ENVELOPING OBJECTS IN ENVELOPING MATERIAL TAKEN FROM TWO STORAGE REELS

[75] Inventors: Claes Björkman, Essingeringen; Leif Lundblad, Djurgardsslätten; Tord Pettersson, Skolvägen, all of Sweden

[73] Assignee: Nybo Seal System AB, Stockholm, Sweden

[21] Appl. No.: 886,528

[22] Filed: May 20, 1992

[51] Int. Cl.⁵ .................. B65B 51/30; B65B 51/14; B65B 61/10; B65B 9/02
[52] U.S. Cl. .................. 53/554; 53/373.7; 53/374.2; 53/374.9; 156/583.1
[58] Field of Search .................. 53/552, 554, 374.9, 53/373.7, 374.2, 553; 156/581, 583.1, 583.2

[56] References Cited

U.S. PATENT DOCUMENTS

| | | | |
|---|---|---|---|
| 3,015,601 | 1/1962 | Fener | 156/583.2 X |
| 3,191,356 | 6/1965 | Zelnick et al. | |
| 3,284,987 | 11/1966 | Sigmon | 53/374.9 |
| 3,287,199 | 11/1966 | Virta | 53/552 X |
| 3,397,505 | 8/1968 | Critchell | 53/374.2 X |
| 3,449,887 | 6/1969 | Abramson | 53/374.9 X |
| 3,874,976 | 4/1975 | MacFarland, Jr. | 156/583.1 X |
| 4,512,138 | 4/1985 | Greenawalt | 53/552 X |
| 4,996,819 | 3/1991 | Davis | 53/554 X |
| 5,031,379 | 7/1991 | Lundblad et al. | |

FOREIGN PATENT DOCUMENTS 1187980 2/1965 Fed. Rep. of Germany.
464215 3/1991 Sweden.
570303 12/1975 Switzerland.

*Primary Examiner*—Horace M. Culver
*Attorney, Agent, or Firm*—Simmons, Perrine, Albright & Ellwood

[57] ABSTRACT

An arrangement for enveloping an object located between two heat weldable webs of enveloping material includes two coacting welding jaws for joining the webs together in their transversal direction on mutually opposite sides of the object. The welding jaws extend in the transverse direction of the webs, across the whole width thereof. One of the jaws is a wire-carrying jaw which supports a freely extending heating wire, and the other jaw is forked and has two legs. The jaws are moveable between a starting position on opposite sides of the webs, and a web welding position in which the webs are held together with the free ends of the fork legs in abutment with one side of the webs and with the heating wire located at the mouth region of the fork gap and in abutment with the other side of the webs. The wire functions to weld said material webs together and to melt-off the webs within the weld region. In the welding position, at least one of the jaws is biased by a spring means towards a further position in which the wire is located within the forked jaw, between the legs thereof at a distance from the mouth of the fork gap.

14 Claims, 1 Drawing Sheet

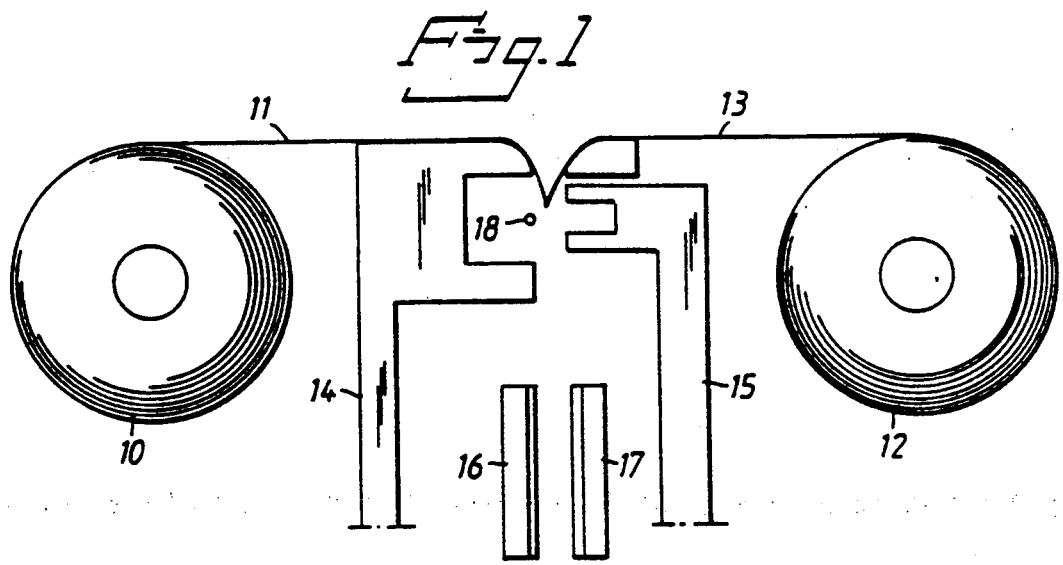
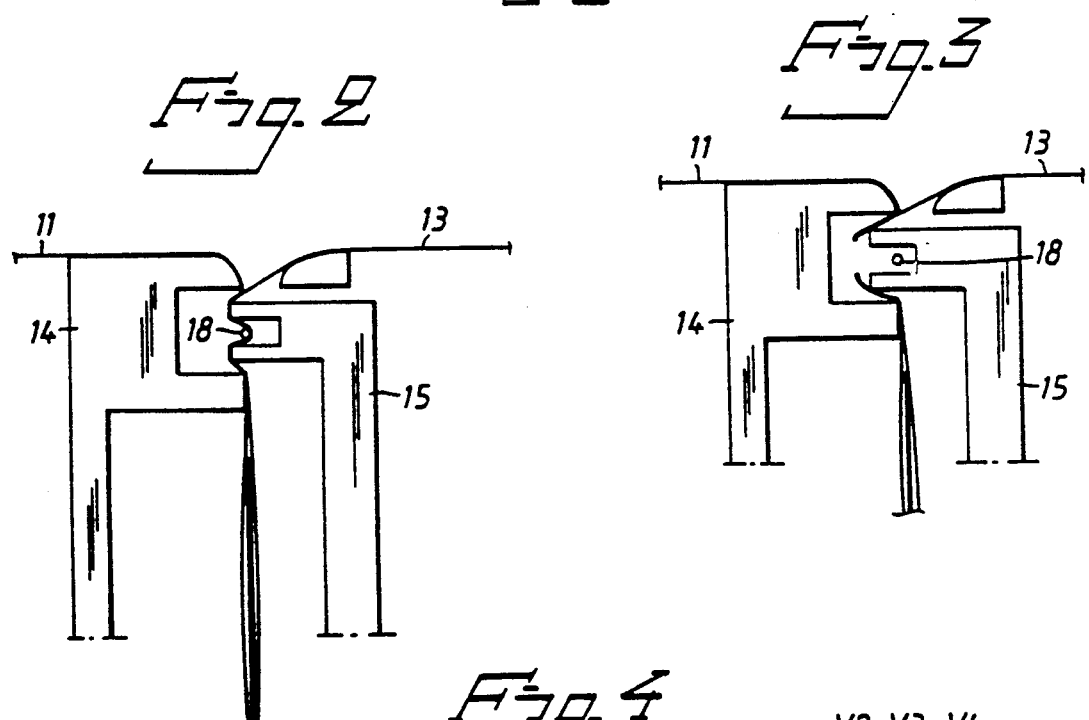
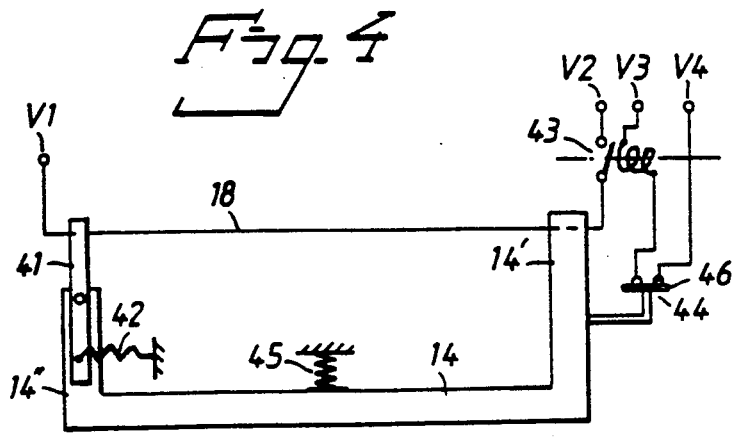

ARRANGEMENT FOR ENVELOPING OBJECTS IN ENVELOPING MATERIAL TAKEN FROM TWO STORAGE REELS

CONSIDERATIONS RELATING TO THE INVENTION

The present invention relates to an arrangement for enveloping objects with enveloping material taken from two storage reels. The reels are intended to deliver material to two sides of the object as the object moves, and joining means are provided for joining together the enveloping material around the object in the vicinity of its outer extremities. The joining means includes two coacting jaws, or more specifically a jaw which carries a heating wire and a forked welding jaw, said jaws functioning to join the enveloping material in a direction perpendicular to the path of movement of the object and to the path of the enveloping material during the process of enveloping said object, and also functioning to subsequently separate at least partially enveloped objects from enveloping material taken from the reels.

DESCRIPTION OF THE PRIOR ART

An arrangement of apparatus of the afore described kind is known from the U.S. patent specification No. 5,031,379. This arrangement has been found to function satisfactorily in practice. Nevertheless, there is a risk that plastic material will fasten to and around the heating wire of said one jaw during the actual web-joining process and also during the process of separating the plastic material, this plastic coating on the heating wire ultimately resulting in a "breakdown" unless the plastic coating is removed in time. The object of the present invention is to eliminate the possibility of such an occurrence.

SUMMARY OF THE INVENTION

Accordingly, the present invention relates to an arrangement for enveloping an object which is located between two heat-weldable webs of enveloping material which are taken from respective storage reels and joined together downstream of said object in the transverse direction of the webs. The arrangement includes two mutually coacting welding jaws for joining the webs together at a point rearwardly of or upstream of the object, as seen in the direction of web movement. The jaws extend in the transverse direction of the webs, across the whole width thereof, and one of the jaws is a wire-carrying jaw which supports a heating wire, while the other jaw is forked and has two fork legs. The jaws are moveable relative to one another, between a starting position, in which they are located on opposite sides of the webs, and a web welding position in which the webs are held together with the free ends of the fork legs in abutment with one side of the webs and with the heating wire located in the mouth region of the fork gap and between said leg ends and abuts the other side of the webs, wherein when hot, the wire functions to weld said material webs together and to burn off or to melt off the webs within the weld region, so as to separate the enveloped or wrapped object from rearwardly located parts of enveloping material. The arrangement is mainly characterized in that the major part of the heating wire is free from the remainder of the wire-carrying jaw and in that, in the welding position of said jaws, at least one of the jaws is biased by a spring towards a further position in which the wire is located within the forked jaw, between the legs thereof at a distance from the mouth of the fork gap and out of contact with the webs of enveloping material.

Suitably, the jaws are brought to said welding position by advancing one jaw towards the other and moving said other jaw rearwardly from its starting position through intermediary action of the web sections located between the jaws, said movement being effected against the action of a spring return device acting on said other jaw.

An advantage is gained when the heating wire includes a conductor which is made of resistive material and through which current can flow, and when the arrangement includes means which function to ensure that current will only flow through said conductor when the jaws are in their respective welding positions.

It is desirable to hold the heating wire in a stretched state, and accordingly the arrangement will preferable include spring means effective to apply a force to the wire in the direction of its longitudinal axis.

BRIEF DESCRIPTION OF THE DRAWINGS

The invention will now be described in more detail with reference to the accompanying schematic drawing, in which FIG. 1 illustrates the main components of an inventive arrangement;

FIG. 2 illustrates in more detail the relative position between two jaws during a welding operation, said jaws being included in the arrangement shown in FIG. 1;

FIG. 3 illustrates the relative position of the two jaws immediately after a separating operation; and FIG. 4 illustrates a number of components of one of the jaws shown in FIGS. 2 and 3.

DETAILED DESCRIPTION OF THE INVENTION

The arrangement illustrated in FIG. 1 includes two storage reels 10, 12 each of which carries a respective web of plastic enveloping material 11 and 13; two mutually coacting welding jaws 14, 15 which function to Weld together the material webs in a horizontal direction, said jaws comprising a jaw 14 which carries a heating wire 18 and a forked welding jaw 15, and two, mutually-coacting second jaws 16, 17 which function to weld in the vertical direction.

In the stage of operations illustrated in FIG. 1, the ends of the material webs 11, 13 have been welded together in a preceding enveloping cycle; in the following enveloping cycle an object (e.g. a bundle of paper sheets) is transported downwards, while taking or entraining enveloping material from the reels 10, 12. When the object together with enveloping material has passed the upper ends of the welding jaws, transportation is stopped and the enveloping procedure is started. The enveloping procedure is started by moving the welding jaw 15 through a first step towards the wire-carrying jaw 14, therewith displacing the jaw from its starting position, shown in FIG. 1, and slightly to the left, against the action of a spring force (45, FIG. 4). In conjunction herewith, electric current is delivered to the heating wire 18, thereby welding together the enveloping material 11 and 13 clamped between the jaws. FIG. 2 illustrates the relative positions of the jaws 14 and 15 during this enveloping procedure. The continued development of heat from the wire 18 separates the now partially enveloped object form the webs of enveloping material 11, 13, whereupon the spring force acting on the wire-carrying jaw 14 moves the jaw to the right and back to its starting position. At the same time, the welding jaw 15 is moved through a second step towards the wire-carrying jaw 14, thereby satisfactorily isolating the wire 18 from the webs 11, 13 of enveloping material and the at least partially enveloped object, see FIG. 3. Electric current to the wire 18 is now interrupted and the wire will cool-off. At the end of a given cooling period, the welding jaw 15 is again moved to the right and the partially enveloped object is moved down by rollers (not shown in the drawing) past the second jaws 16 and 17, which effect side-welding in one or more stages. The enveloping procedure is now terminated and the arrangement is back in it starting position, ready for the commencement of a new enveloping cycle.

The wire 18 is acted upon a spring force in its longitudinal direction, so as to equalize variations in length of the wire caused by variations in temperature.

When an enveloping cycle is initiated after a given time lapse from the time of completing a preceding enveloping cycle, e.g. 20 seconds, current is preferably delivered to the heating wire 18 over a short period of time, for instance some tens of seconds, so as to eliminate the influence of any small plastic residues on the wire.

The apparatus includes, in a known manner, sensors for controlling and steering the different stages of the enveloping cycle, and also to give a warning signal in the event of an occurrence which lies outside the program, i.e. overheating, a broken web, etc.

According to the embodiment described above, it is the welding jaw 15 that moves in two stages towards the wire-carrying jaw. As will be understood, the wire-carrying jaw may alternatively be moved toward the welding jaw, or both of said jaws may be moved through a first step towards each other and then moved through the second step. It is essential, however, that the relative movement between said jaws is effected correctly in accordance with a programmed sequence, i.e. the sequence heating-welding-separating-cooling.

It will be seen from FIG. 4 that the major part of the length of the heating wire 18 fitted to the wire-carrying jaw 14 is free from the jaw. The right end of the wire 18 is firmly anchored to the right, angled end 14' of the jaw 14, while the left end of the wire is attached to a movably mounted arm 41 having a draw spring 42 attached to the bottom end thereof. The arm 41 is journalled in the left, angled and 14" of the wire-carrying jaw 14. The ends of the wire are connected to points of electrical potential V1 and—via an electric contact 43—V2, said potentials being suitable for heating of the wire 18. The electric contact 43 forms part of a relay whose winding is connected to points of electrical potential V3 and—over an electric contact 44—V4, which are selected for breaking the contact 43 when the contact 44 is closed.

When the wire-carrying jaw 14 is moved downwards slightly from its starting position (shown in FIG. 4), a contact plate 46 attached to the jaw 14 accompanies this downward movement of the jaw, therewith breaking the contact 44. When the object has been separated from the enveloping material taken from the reels during the welding process, the wire-carrying jaw is moved back (upwards) by a pull spring 45, therewith closing the contact 44 and breaking the contact 43. The wire-carrying jaw 14 is therewith back in its starting position.

I claim:

1. An arrangement for enveloping an object which is located between two heat-weldable webs of enveloping material which are taken from respective storage reels and joined together downstream of said object in a transverse direction of the webs, said arrangement including two mutually coacting welding jaws for joining the webs together at a point upstream of the object, which jaws extend in the transverse direction of the webs across the width thereof and of which one is a wire-carrying jaw which carries a heating wire and the other jaw is a forked jaw having two fork legs having ends separated by a fork gap said jaws being moveable relative to one another between a starting position on opposite sides of the webs and a welding position, in which the webs are held together with the free ends of the fork legs in abutment with one side of the webs and with the heating wire located in the mouth region of the fork gap and between said leg ends and abuts the other side of the webs, and in which, when hot, the wire functions to weld said material webs together and to burn off or melt off the webs within the weld region so as to separate the enveloped object from rearwardly located parts of enveloping material, wherein a major part of the heating wire is free from a remainder of the wire-carrying jaw, and wherein, in the welding position, at least one of the jaws is biased by a spring device towards a further position in which the wire is located within the forked jaw, between the legs thereof at a distance from the mouth of the fork gap and out of contact with the webs of enveloping material.

2. The arrangement according to claim 1, spring means coupled to an end of the heating wire, the spring means stretching the heating wire longitudinally, thereby holding the wire stretched.

3. The arrangement according to claim 1, wherein the heating wire includes a conductor of resistive material coupled for current flow, and wherein the arrangement further includes means for activating current flow when the jaws are in their respective welding positions.

4. The arrangement according to claim 1, wherein, so as to be brought to the welding position, one jaw is movably mounted to be advanced towards the other jaw and the other jaw is movably mounted for movement rearwards from its starting position through intermediary action of the webs located between the jaws, the movement of the one jaw and the other jaw moving the jaws into a welding position, the movement of said other jaw being effected against the action of a spring return device acting on said other jaw.

5. The arrangement according to claim 4, wherein the heating wire is mounted at first and second positions thereof between a first fixed end and a second movable support arm, and wherein the movable support arm is biased by a spring means for supporting the wire under the force of the spring to maintain the heating wire stretched.

6. The arrangement according to claim 4, wherein the heating wire includes a conductor made of resistive material through which current can flow, and wherein the arrangement further includes means which function to ensure that current will flow through said conductor only when the jaws are in their respective welding positions.

7. The arrangement according to claims 4, wherein the heating wire is acted upon in its longitudinal direction by a spring force such as to hold the wire stretched.

8. An arrangement for enveloping an object between two heat-weldable webs of enveloping material taken from two respective reels of the enveloping material of indeterminate length, the arrangement including means for welding and for severing the webs at a predetermined position transversely to the lengths of the webs, the welding and severing means comprising;

first and second mutually coacting welding jaws extending in parallel over a length corresponding to a width of the webs, the jaws being movably mounted to move toward and away with respect to each other and having a first spaced position for advancing the webs and the object between the jaws, a second position for welding and severing the web, and a third cooling position;

a heating wire supported under tension by the first jaw, and having a major part disposed spacedly from the first jaw along the length of the first jaw;

the second jaw having a forked end having a mouth forming a fork gap parallel to the heating wire, such that upon movement of the jaws from the first spaced position toward the welding and severing position, the heating wire is disposed to engage webs extending across the gap of the second jaw;

means for heating the heating wire upon movement into the welding and severing position; and means for disabling the heating means after welding and severing the welded webs through welded portions transversely of the lengths of the webs.

9. The arrangement according to claim 8, wherein the first and second jaws are movably mounted, for each of the jaws to move between a forward position toward the other jaw and a rearward position in a direction away from the respective other jaw, and wherein the first spaced position of the jaws is defined by the first jaw being in the forward position and the second jaw being in the rearward position, the second jaw forming the spaced position with the first jaw.

10. The arrangement according to claim 9, further comprising spring means for resiliently biasing the first jaw into its forward position, and wherein the movement of the second jaw into the forward position of the second jaw engages webs extending the length of the jaws, and wherein the engagement of said webs by the second jaw and the movement of the second jaw toward the forward position of the second jaw coacts with the first jaw position in the rearward position.

11. The arrangement according to claim 10, wherein the means for heating the heating wire upon movement into the welding and severing position comprises an electrical power source applied through the heating wire and switch means coupled to the power source and actuated upon movement of the first jaw into the rearward position applying electrical power to the heating wire.

12. The arrangement according to claim 11, wherein means for disabling the heating means comprises the spring means for moving the first jaw into the forward position of the first jaw upon severance of the welded webs, and in combination therewith the switch means and means for deactivating the switch means upon movement into the forward position of the first jaw.

13. The arrangement according to claim 8, further comprising means for maintaining tension of the heating wire upon the wire undergoing temperature dependent changes in length.

14. The arrangement according to claim 13 wherein the tension maintaining means comprises a first heating wire support end for supporting a first position of the heating wire and a pivotally or movably mounted arm for supporting a second position of the heating wire, and a spring coupled to the arm and the jaw for imparting the spring force to the wire.

* * * * *